Patented June 17, 1930

1,764,023

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

OXIDATION OF FLUORENE

No Drawing.    Application filed October 4, 1928. Serial No. 310,438.

This invention relates to the oxidation of fluorene and its substituted compounds and more particularly to vapor phase catalytic oxidations.

It has been proposed to oxidize fluorene itself catalytically in the presence of air or other oxidizing gases using metal oxide catalysts such as vanadium oxide and oxides of the other metal elements of the fifth and sixth groups of the periodic system. This process has been almost a complete failure commercially because the yields obtained with metal oxide catalysts are very low and the product is of poor quality, containing many undesired by-products.

The present invention is based on the use of a different class of catalysts or contact masses in the catalytic vapor-phase oxidation of fluorene substances. It has been found that the lack of success of the process formerly proposed is due primarily to the use of the metal oxide catalysts. Contrary to the opinion held hitherto that these catalysts are the most effective, it has been found that they are practically worthless for commercial production but, surprising as it may seem, good yields of fluorenone or substituted fluorenones, (in the case where substituted fluorene substances are oxidized), may be obtained and the product is of a very satisfactory and in some cases almost complete purity when salts of the metal acids of the fifth and sixth groups of the periodic system are used as contact masses. These salts may be of the alkali or alkaline earth metals or of heavy metals such as iron, silver, manganese, aluminum, nickel, cobalt, copper, chromium, titanium, zirconium, thorium, cerium, etc. While salts of any of the metal acids of the fifth and sixth groups of the periodic system may be used vanadates, vanadites, and molybdates have been found to be the most effective. Salts of the other acids may be used although they are less effective and may be combined with salts of the acids of vanadium or molybdenum. Complex salts, such as the highly porous puffed vanadyl vanadates, particularly those of copper, silver and the alkali metals may also be used and constitute very effective contact masses owing to the extremely fine porous structure produced when the salt is formed in most cases with evolution of oxygen. It should be understood that the use of puffed vanadyl vanadates as contact masses for organic oxidations generally is not claimed in the present invention.

I have found that the general reaction conditions using ordinary commercial fluorene for example from 80–90% purity, are similar to those under which anthracene may be oxidized to anthraquinone with the same or similar contact masses. In fact, strange as it may seem, many of the contact masses which favor the oxidation of anthracene to anthraquinone also favor the oxidation of fluorene or its substituted derivatives, such as halogen substituted fluorenes to the corresponding fluorenones. The reaction conditions will vary, of course, with different contact masses but in general most contact masses which are effective for the production of anthraquinone may be used at temperatures around 400° C., although the temperature range may be varied within wide limits as will be brought out in greater detail in the specific examples and the present invention should in no sense be considered as limited to the use of any particular temperature or to any narrow temperature range.

Catalytically effective metal salts of the present invention may be used as such but are preferably impregnated or coated onto natural or artificial carrier material which may, for example, be of a finely porous nature, such as pumice fragments, "Celite" brick fragments, etc., or may have a roughened surface, such as etched quartz fragments, quartz filter stone fragments, etched metal granules, such as those of aluminum or various ferrous alloys, and the like. In fact any suitable carrier material may be used in preparing metal salt contact masses of the present invention, and the above carriers have been mentioned merely as illustrations of a few typical materials which can be used.

While the invention is not limited to the nature of the oxidizing gases used, it has been found that it is of advantage to add steam as a diluent for the oxygen of the gases. The presence of steam appears to smooth the reaction and gives better yields of a purer product. Processes of catalytically oxidizing fluorene substances by means of metal salt catalysts in the presence of steam may, therefore, be considered as preferred embodiments of the present invention which, however, is in no sense limited to the use of steam.

The invention will be described in greater detail in connection with the following specific examples which describe a few representative embodiments of the process.

Example 1

18.2 parts of $V_2O_5$ are dissolved in 250 parts of a potassium hydroxide solution containing 22.6 parts of KOH. 27 parts of ferric sulfate are dissolved in 300 parts of water at 50–60° C. and the potassium vanadate solution is poured into the hot solution with vigorous agitation. The yellow precipitate of ferric vanadate which is obtained is filtered by suction, washed with water until the wash water is colorless and then the wet cake is sludged in 200 parts of water and the suspension coated uniformly onto 500 volumes of 8–12 mesh pumice fragments by spraying the suspension onto the carrier material which is agitated, for example in a revolving spray pay, and heated to a sufficiently high temperature so that the water of the suspension is vaporized immediately on striking the carrier material. The contact mass thus obtained is filled into a converter and blown with air at 350–400° C. and is then ready for use.

Fluorene of various grades of purity, for example 80–85%, is uniformly vaporized in an air stream in the ratio of 1:30 by weight and passed over the contact mass at 360–400° C. Good yields of fluorenone of excellent purity are obtained. The temperature of reaction should be accurately controlled and it is advantageous although by no means essential that the reaction be carried out in tubular converters with small catalyst tubes, for example ¾" internal diameter and 9–12" catalyst depth, surrounded by a temperature regulating bath. This bath may advantageously be mercury or preferably a mercury alloy which boils at the desired temperature. Mercury may be used alone but in such a case it is necessary to cause it to boil under pressure which renders it less satisfactory than alloy baths and also greatly increases the expense. Examples of mercury alloys are alloys of mercury and cadmium, or mercury and lead. An alloy of the latter containing 30 parts of mercury to 70 parts of lead is very satisfactory.

Instead of using a ferric pyrovanadate contact mass as described above, other iron salts of vanadic acid or complex compounds of vanadic acid and iron may be used. Part or all of the vanadic acid may also be replaced by one or more of the acids of the metal elements of the fifth and sixth groups of the periodic system, such as molybdenum, tungsten, uranium, chromium, tantalum or columbium. Some of these contact masses produce small amounts of phthalic anhydride and maleic acid in addition to fluorenone and these impurities may be easily separated and if present in sufficient amount can be recovered and utilized. When a contact mass is used or the reaction conditions are such that phthalic anhydride and maleic acid are obtained, it is desirable to use steam because in the presence of steam the phthalic anhydride is transformed into phthalic acid at about 191° C., which compound is non-volatile. It is thus possible, by careful cooling of the exhaust gases when steam is used, to remove practically all of the phthalic anhydride and in some cases maleic acid. The use of steam is also desirable in increasing the yields and smoothing the reaction and may be varied within wide limits. The introduction may be in the form of steam, or wet air may be used.

Instead of iron salts of metal acids of the fifth and sixth groups of the periodic system, other salts may be substituted partly or wholly, such as those of copper, nickel, cobalt, silver, aluminum, titanium, ziroconium, manganese or cerium.

The pumice fragments may, of course, be replaced by other carriers such as roughened quartz fragments, fragments of quartz filter stones, sand stones, "Celite" bricks, natural or artificial silicates, base exchange bodies, especially zeolites prepared either by fusion or wet methods and in the latter case preferably diluted with materials rich in silica, metal granules such as aluminum granules or granules of metal alloys such as ferrosilicon, ferrovanadium, and the like.

Instead of oxidizing fluorene, halogen substituted fluorene may be oxidized under the same reaction conditions, the products of course being halogen substituted fluorenone.

Example 2

300 parts of $V_2O_5$ are intimately mixed with about 94 parts of silver nitrate and melted. The melt is permitted to cool and during cooling puffs up to form the porous vanadyl vanadate with evolution of large quantities of oxygen. The puffed product is then broken into pea sized fragments and is ready for use. If desired, diluents such as kieselguhr may be incorporated into the melt in order to produce a diluted silver vanadyl vanadate contact mass.

80% fluorene is uniformly vaporized with air and steam in the proportion of 1:30:10 by weight and passed over the silver vanadyl vanadate contact mass at 370–390° C. Good yields of fluorenone of high purity are obtained. The silver vanadyl vanadate may be replaced partly or wholly with corresponding amounts of sodium, potassium, lithium, rubidium, or caeseium vanadyl vanadates. The desirable ratios of $V_2O_5$ to the basic oxides for the different vanadyl vanadates are as follows:

$V_2O_5$ to $Na_2O$ as 6:1
$V_2O_5$ to $K_2O$ as 5:1
$V_2O_5$ to $Li_2O$ as 2:1
$V_2O_5$ to $Rb_2O$ as 5:1
$V_2O_5$ to $Cs_2O$ as 5:1

In the claims the expression "fluorene substance" is intended to cover fluorene, its homologues and halogen substituted derivatives.

What is claimed as new is:

1. A method of oxidizing fluorene substances, which comprises vaporizing the fluorene substances, admixing the vapors with an oxidizing gas and passing them over a contact mass containing at least one salt of a metal acid of the fifth and sixth groups of the periodic system.

2. A method of oxidizing fluorene substances, which comprises vaporizing the fluorene substances, admixing the vapors with an oxidizing gas and passing them over a contact mass containing at least one salt of a metal acid of the fifth and sixth groups of the periodic system with a metal other than an alkali-forming metal.

3. A method of oxidizing fluorene substances, which comprises vaporizing the fluorene substances, admixing the vapors with an oxidizing gas and passing them over a contact mass containing at least one salt of an acid of vanadium.

4. A method of oxidizing fluorene substances, which comprises vaporizing the fluorene substances, admixing the vapors with an oxidizing gas and passing them over a contact mass containing at least one vanadate.

5. A method of oxidizing fluorene substances, which comprises vaporizing the fluorene substances, admixing the vapors with an oxidizing gas and passing them over a contact mass containing at least one vanadate of a heavy metal.

6. A method of oxidizing fluorene substances, which comprises vaporizing the fluorene substances, admixing the vapors with an oxidizing gas and passing them over a contact mass containing iron vanadate.

7. A method of oxidizing fluorene substances, which comprises vaporizing the fluorene substances, admixing the vapors with an oxidizing gas in the presence of steam and passing them over a contact mass containing at least one salt of a metal acid of the fifth and sixth groups of the periodic system.

8. A method of oxidizing fluorene substances, which comprises vaporizing the fluorene substances, admixing the vapors with an oxidizing gas in the presence of steam and passing them over a contact mass containing at least one salt of a metal acid of the fifth and sixth groups of the periodic system with a metal other than an alkali-forming metal.

9. A method of oxidizing fluorene substances, which comprises vaporizing the fluorene substances, admixing the vapors with an oxidizing gas in the presence of steam and passing them over a contact mass containing at least one salt of an acid of vanadium.

10. A method of oxidizing fluorene substances, which comprises vaporizing the fluorene substances, admixing the vapors with an oxidizing gas in the presence of steam and passing them over a contact mass containing at least one vanadate.

11. A method of oxidizing fluorene substances, which comprises vaporizing the fluorene substances, admixing the vapors with an oxidizing gas in the presence of steam and passing them over a contact mass containing at least one vanadate of a heavy metal.

12. A method of oxidizing fluorene substances, which comprises vaporizing the fluorene substances, admixing the vapors with an oxidizing gas in the presence of steam and passing them over a contact mass containing iron vanadate.

Signed at Pittsburgh, Pennsylvania, this 2nd day of October, 1928.

ALPHONS O. JAEGER.